(12) United States Patent
Wu

(10) Patent No.: US 10,934,638 B2
(45) Date of Patent: Mar. 2, 2021

(54) ENGINEERED FIBER BUNDLES FOR REINFORCING COMPOSITE MATERIALS

(71) Applicant: Hwai-Chung Wu, Ann Arbor, MI (US)

(72) Inventor: Hwai-Chung Wu, Ann Arbor, MI (US)

( * ) Notice: Subject to any disclaimer, the term of this patent is extended or adjusted under 35 U.S.C. 154(b) by 152 days.

(21) Appl. No.: 16/211,897

(22) Filed: Dec. 6, 2018

(65) Prior Publication Data
US 2019/0177886 A1  Jun. 13, 2019

Related U.S. Application Data

(60) Provisional application No. 62/597,232, filed on Dec. 11, 2017.

(51) Int. Cl.
| | |
|---|---|
| *D02G 3/44* | (2006.01) |
| *B29C 70/16* | (2006.01) |
| *D07B 1/16* | (2006.01) |
| *D07B 5/00* | (2006.01) |
| *D02G 3/40* | (2006.01) |

(52) U.S. Cl.
CPC ............. *D02G 3/447* (2013.01); *B29C 70/16* (2013.01); *D02G 3/404* (2013.01); *D07B 1/16* (2013.01); *D07B 5/006* (2015.07); *D07B 2201/2006* (2013.01); *D07B 2201/2009* (2013.01); *D07B 2201/2012* (2013.01); *D07B 2201/2087* (2013.01); *D07B 2201/2092* (2013.01); *D07B 2401/2055* (2013.01)

(58) Field of Classification Search
CPC ....... C04B 14/442; C04B 14/44; C04B 14/38; C04B 16/06; C03C 25/40; C03C 15/00; C03C 27/00; C08K 7/14; D04H 1/42; D04H 1/64; D21H 13/50; D21H 21/16; B29C 70/16; D02G 3/404; D02G 3/447; D06M 15/55; Y10T 156/1052; Y10T 156/1054; Y10T 428/2905; Y10T 428/2938; Y10T 442/2402; Y10T 442/614; Y10T 442/619
USPC ......... 523/400; 428/360, 378, 375; 156/250, 156/296, 305, 251; 442/340, 344, 108
See application file for complete search history.

(56) References Cited

U.S. PATENT DOCUMENTS

| | | | | |
|---|---|---|---|---|
| 4,418,103 | A | * 11/1983 | Tani | ............... D04H 1/00 156/183 |
| 2003/0172683 | A1 | * 9/2003 | Tang | ............... D02G 3/18 65/529 |
| 2015/0166830 | A1 | * 6/2015 | Tardy | ............... C04B 14/44 523/400 |

FOREIGN PATENT DOCUMENTS

WO  WO-2016117435 A1 *  7/2016  ......... C04B 16/0675

* cited by examiner

*Primary Examiner* — Camie S Thompson
(74) *Attorney, Agent, or Firm* — Scherrer Patent & Trademark Law, P.C.; Stephen T. Scherrer; Monique A. Morneault

(57) ABSTRACT

The present invention relates to an engineered fiber bundle for reinforcement of composite materials. Specifically, the engineered fiber bundles of the present invention enhance the tensile behavior of the composites reinforced with the fiber bundles. Methods of making the same are further provided.

24 Claims, 2 Drawing Sheets

Tensile stress-strain curves of regular FRC and HPFRC.

Flexural stress-mid point displacement curves of regular FRC and HPFRC.

ENGINEERED FIBER BUNDLES FOR REINFORCING COMPOSITE MATERIALS

The present invention claims priority to U.S. Prov. Pat. App. No. 62/597,232, titled "Engineered Fiber Bundles For Reinforcing Composite Materials," filed Dec. 11, 2017, which is incorporated herein by reference in its entirety.

TECHNICAL FIELD

The present invention relates to an engineered fiber bundle for reinforcement of composite materials. Specifically, the engineered fiber bundles of the present invention enhance the tensile behavior of the composites reinforced with the fiber bundles. Methods of making the same are further provided.

BACKGROUND

Cement and concrete are the most heavily used construction materials in the world because it is relatively inexpensive and concrete ingredients are relatively prevalent. However, concrete has low tensile strength, low ductility, and low toughness (energy absorption). Intrinsic causes of the poor tensile behavior of concrete are its low toughness and sensitivity to the presence of defects. Low ductility results from catastrophic failure of concrete, which is typical for brittle materials.

Hence, concrete is traditionally considered a compression only material; for tension members reinforcing steel bars are incorporated in the structural design for tension. However, concrete cracking and spalling often lead to exposure of steel bars. Aggressive agents such as chlorine ion easily migrate and attack steel reinforcement, which causes further concrete cracking and spalling. Eventually the integrity of structures is lost.

One way to improve the above problems of concrete is by adding discontinuous fibers to the concrete mix. When a cement composite is loaded up to its first cracking strength under uniaxial tensile loading, a first macroscopic crack is formed in the composite. Upon the formation of the macroscopic crack, the composite load will then be shared by the bridging fibers. These fibers then transfer the load via their interface back into the matrix. During crack opening, the bridging stress increases as fiber/matrix interface debond and the debonded segments of fibers stretch. The maximum bridging stress can be significantly higher than the first cracking strength, therefore the ultimate tensile strength of fiber reinforced concrete is greatly improved. Increases up to ten times can be achieved.

If enough load is transferred via adequately designed fiber bridging, the matrix may crack again and the process repeats until the matrix is broken by a series of subparallel cracks of approximately equal crack spacing. The pseudo ductility of the cementitious composites results from such multiple cracking phenomenon. The composites will undergo pseudo strain-hardening when loaded beyond the elastic limit. Straining of the bridging fibers across the matrix cracks and within the matrix blocks give rise to a composite strain that can be substantially higher than the matrix failure strain alone. A record high 8% composite strain is reported with merely 2% fiber reinforcement by volume. The typical failure strain of plain concrete is only 0.04%. In this fracture process, bridging fibers can provide resistance to crack propagation and crack opening, thus improving concrete toughness. Orders of magnitude increases in toughness over plain concrete are commonly observed.

The bridging law describes the relationship between the averaged stress carried by the fibers bridging across a matrix crack and the opening of this crack ($\delta$). For randomly oriented short fibers and fiber pull-out (rather than fiber rupture, when fiber rupture occurs, the following Eqns. (1) and (2) should be modified accordingly), the bridging law can be derived as:

$$\sigma(\delta) = \begin{cases} \sigma_o[2(\delta/\delta_o)^{1/2} - (\delta/\delta_o)] & \text{for } \delta \leq \delta_o \\ \sigma_o(1 - 2\delta/L_f)^2 & \text{for } \delta_o \leq \delta \leq L_f/2 \\ 0 & \text{for } L_f/2 \leq \delta \end{cases} \quad (1)$$

where $\delta_o = \tau L_f^2/[E_f d_f(1+\eta)]$ is the crack opening corresponding to the maximum bridging stress:

$$\sigma_o = \frac{1}{2} g \tau V_f \frac{L_f}{d_f} \quad (2)$$

where g=snubbing factor; $\tau$=bond strength; $d_f$=fiber diameter; $L_f$=fiber length; $\eta = V_f E_f / V_m E_m$; E=modulus; V=volume fraction; and subscripts f and m referring to fiber and matrix, respectively.

Additional bridging due to the presence of aggregates in concrete can be expressed as:

$$\sigma_a(\delta) = \frac{\sigma_{mu}}{1 + \left(\frac{\delta}{\delta_c}\right)^p} \quad (3)$$

where $\sigma_{mu}$ is stress in the plain concrete at first crack, and $\delta_c$ and p are empirical parameters.

Therefore, total bridging stress is the sum of Eqn. (1) and (3). Eqns. (1)-(3), embodying all relevant microparameters, can be used to guide the selection of desired materials constituents including fiber types and fiber sizes (fiber length and diameter) so as to control the crack openings. Furthermore, conditions for pseudo strain-hardening are found to depend on a critical fiber volume fraction, $V_f^{crit}$, defined as the minimum fiber quantity required for achieving multiple cracking. This leads to $$V_f \geq V_f^{crit} \equiv \frac{12 J_{tip}}{g\tau(L_f/d_f)\delta_o} \quad (4)$$

where $J_{tip}$ is the matrix toughness. It is clearly shown in Eqn. (4) that low matrix toughness ($J_{tip}$), strong interfacial bond ($\tau$) and high aspect ratio of the fiber ($L_f/d_f$) are favorable to pseudo strain-hardening. However, high strength matrices leading to high strength composites are typically associated with high matrix toughness. Thus the pseudo strain-hardening behavior of such composites is likely suppressed, unless fiber volume fraction, fiber aspect ratio, and bond strength can be substantially increased. It is well recognized that both high $L_f/d_f$ and high $V_f$ are notorious for processing difficulty and high production cost. Hence it is most efficient when we can primarily improve bond strength to its full capacity. In addition, high bond strength also contributes to enhanced composite ultimate strength (see Eqn. (2)).

The above discussions and Eqn. (4) are derived assuming that fiber does not rupture. However, when bond strength gets too high, fiber rupture may take place. It is found that $V_f^{crit}$ grows rapidly with increasing fiber rupture. Others have investigated the effect of fiber rupture on the composite tensile strength and toughness (or fracture energy) and have concluded from their analysis that fiber rupture might lead to very high composite strength but at the expense of ductility and toughness due to loss of pseudo strain-hardening. However, the prediction of high composite strength was not satisfactorily supported by the experimental data. A much lower composite tensile strength of 4 MPa was measured, as contrast to the prediction of 20 MPa and the authors attribute the discrepancy to the early fiber rupture prior to the complete crack propagation across the entire specimen section. Even more adversely, an immediate load drop occurs at the onset of fiber rupture leading to a brittle failure such as that of plain concrete. Hence low ductility and low toughness remain.

At present, all commercial short reinforcement fibers for concrete are in single filament form. Hence, such discrete fibers tend to rupture when loaded, especially when interfacial bonds are high. A need, therefore, exists for improved discrete fibers for reinforcing composite materials. Specifically, a need exists for improved engineered fiber bundles that take full advantage of the extraordinarily high bond strength of these fibers. More specifically, a need exists for improved engineered fiber bundles that avoid early fiber rupture.

In addition, a need exists for improved engineered fiber bundles that enhance the tensile behavior of the composites reinforced with the fiber bundles, namely composite strength, ductility, and toughness. Specifically, a need exists for improved engineered fiber bundles that bond strongly with the composite base material, thereby delaying fiber bundle rupture. More specifically, a need exists for improved engineered fiber bundles having individual filaments that are confined by surrounding filaments via friction, and not adherence, thereby permitting gradual but independent fiber rupture, retarding the onset of global bundle failure, and enabling prolonged fiber bridging. In cases, a desired balance between friction and adhesion between fibers should be optimized for composite performance.

SUMMARY OF THE INVENTION

The present invention relates to an engineered fiber bundle for reinforcement of composite materials. Specifically, the engineered fiber bundles of the present invention enhance the tensile behavior of the composites reinforced with the fiber bundles. Methods of making the same are further provided.

To this end, in an embodiment of the present invention, a fiber bundle for use in making a fiber reinforced composite is provided. The fiber bundle comprises: a plurality of fibers grouped together forming the fiber bundle, each of the fibers having a finish to increase friction of the fibers to each other compared to fibers without coatings thereon; and an adhesive disposed on the outside surface of the fiber bundle.

In an embodiment, the fibers are selected from the group consisting of aramid, polyvinyl alcohol, glass, carbon, basalt, polypropylene, polyethylene, polyamide, acrylic, ceramic, steel, and combinations thereof.

In an embodiment, the fibers range in filament size between about 5 μm and about 200 μm.

In an embodiment, the bundle size ranges in diameter from between about 0.2 mm and about 5 mm, and from about 5 mm to about 60 mm in length.

In an embodiment, the finish of each of the fibers comprises a coating selected from the group consisting of oils, polyglycols, silicates, dimethyl urea derivatives, lithium chloride, butyl stearate, and combinations thereof.

In an embodiment, coating on the fibers comprises between about 0.5% and about 6.5% by weight of the fiber bundle.

In an embodiment, the adhesive disposed on the outside surface of the fiber bundle is selected from the group consisting of phenolic, epoxy, polyester, vinyl ester, urethane, and combinations thereof.

In an embodiment, the fiber bundle has a fiber content of between about 50 and about 3000 fibers.

In an embodiment, the fiber bundle forms a fiber reinforced composite with a base material.

In an embodiment, the base material is selected from the group consisting of Portland cement, cementitious binders, polymers, ceramics, metals and combinations thereof.

In an embodiment, the cement is selected from the group consisting of high alumina cement, sulfoaluminate cement, alkali activated cement, magnesium cement, and combinations thereof.

In an alternate embodiment of the present invention, a method of making a fiber bundle is provided. The method comprises the steps of: providing a plurality of fibers; coating the fibers with a finish; grouping the fibers to form a fiber bundle; and applying an adhesive on a surface of the fiber bundle.

In an alternate embodiment, the fibers are selected from the group consisting of aramid, polyvinyl alcohol, glass, carbon, basalt, polypropylene, polyethylene, polyamide, acrylic, ceramic, steel, and combinations thereof.

In an alternate embodiment, the fibers range in filament size between about 5 μm and about 200 μm.

In an alternate embodiment, the bundle size ranges in diameter from between about 0.2 mm and about 5 mm, and from about 5 mm to about 60 mm in length.

In an alternate embodiment, the finish of each of the fibers comprises a coating selected from the group consisting of oils, polyglycols, silicates, dimethyl urea derivatives, lithium chloride, butyl stearate, and combinations thereof.

In an alternate embodiment, the coating on the fibers comprises between about 0.5% and about 6.5% by weight of the fiber bundle.

In an alternate embodiment, the adhesive disposed on the outside surface of the fiber bundle is selected from the group consisting of phenolic, epoxy, polyester, vinyl ester, urethane, and combinations thereof.

In an alternate embodiment, the fiber bundle has a fiber content of between about 50 and about 3000 fibers.

In an alternate embodiment, the method further comprises the step of: cutting the fiber bundle with heat to cause the cut ends of the fiber bundle to fuse together.

It is, therefore, an advantage and objective of the present invention to provide improved engineered fiber bundles for reinforcing composite materials.

Specifically, it is an advantage and objective of the present invention to provide improved engineered fiber bundles that take full advantage of the extraordinarily high bond strength of these fibers.

More specifically, it is an advantage and objective of the present invention to provide improved engineered fiber bundles that avoid early fiber rupture.

In addition, it is an advantage and objective of the present invention to provide improved engineered fiber bundles that enhance the tensile behavior of the composites reinforced with the fiber bundles, namely composite strength, ductility, and toughness.

Specifically, it is an advantage and objective of the present invention to provide improved engineered fiber bundles that bond strongly with the composite base material, thereby delaying fiber bundle rupture.

More specifically, it is an advantage and objective of the present invention to provide improved engineered fiber bundles having individual filaments that are confined by surrounding filaments via friction, and not adherence, thereby permitting gradual but independent fiber rupture, retarding the onset of global bundle failure, and enabling prolonged fiber bridging.

In cases, it is an advantage and objective of the present invention to provide improved engineered fiber bundles having individual filaments that are confined by surrounding filaments via a combination of friction and adherence, thereby permitting gradual but controlled fiber rupture, retarding the onset of global bundle failure, enabling prolonged fiber bridging, and achieving high composite strength.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to an engineered fiber bundle for reinforcement of composite materials. Specifically, the engineered fiber bundles of the present invention enhance the tensile behavior of the composites reinforced with the fiber bundles. Methods of making the same are further provided.

As shown in Eqn. (2), above, the composite strength increases monotonically with increasing bond strength. This scenario is true only up to some allowable degree of fiber rupture. Exceeding the limit, the composite strength might show a significant reduction when sever fiber rupture occurs due to overly strong bonding. This is particularly the case for composites reinforced with strong adhesion hydrophilic fibers such as aramid or polyvinyl acetate (PVA).

To take full advantage of the extraordinarily high bond strength of these fibers, and to avoid early fiber rupture, the present invention uses engineered fiber bundles instead of discrete fibers. Each discontinuous bundle consists of a plurality of fiber filaments. These filaments may be loosely glued together so that they may behave as a single unit, but not strongly bonded to act like one large single fiber. This consideration is critical to deriving the concept of effective bonds, and to delaying fiber rupture so as to permit/promote multiple cracking. The fiber bundles of the present invention are only bonded strongly with cement along its perimeter where direct contact is possible. Within the bundle, each individual filament may be confined by surrounding filaments via friction, but preferably not adhered to each other. In cases, a combination of friction and adhesion may be utilized for further improving composite strength. Stretching the fiber bundles, therefore permitting gradual but independent fiber rupture, may retard the onset of global failure of the bundle and enable a prolonged fiber bridging. In addition, each individual filament may conform to the bundle, greatly reducing the possibility of bending rupture due to abrupt angles. Such premature fiber rupture prior to the formation of the macroscopic crack crossing the entire specimen has been shown to be one of the major factors leading to significant losses in composite strength, ductility, and toughness. Further, desirable bundle dimensions including numbers of filaments per bundle and bundle sizes, such as, for example, bundle diameter and bundle length, can be engineered.

Figure 1:
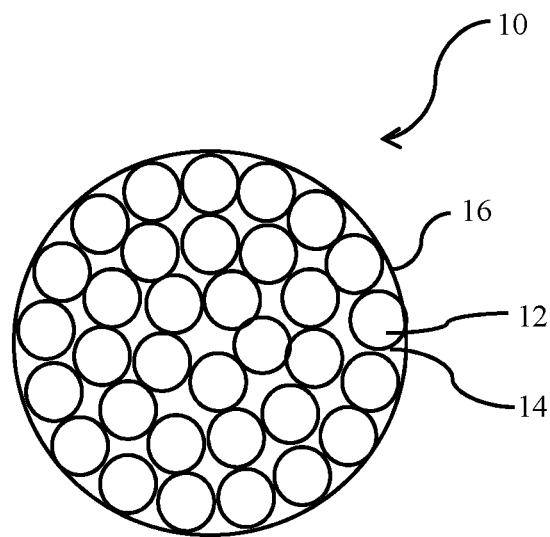
FIG. 1 illustrates a cross-sectional view of a fiber bundle in an embodiment of the present invention.

Now referring to the figures, wherein like numerals refer to like parts, FIG. 1 illustrates a cross-section of a fiber bundle 10 in an embodiment of the present invention. The fiber bundle 10 comprises a plurality of fibers 12 generally filling the entire space within the fiber bundle 10. Each fiber preferably contains no added adhesive within the bundle, and the fibers maintain cohesion to each other via friction, specifically due to a finish 14 of the fibers, which may be added via spin finishing, as detailed below. In alternative embodiments, higher contents of finish or an adhesive may be used on the surfaces of the fibers to control the rigidity or flexibility of the fiber bundle 10. On the surface of the fiber bundle 10 may be an adhesive coating and/or finish 16 that may hold the fiber bundles 10 together and prevent premature fiber rupture, as disclosed in more detail below.

The fibers 12 of the present invention are preferably made from a material selected from the group consisting of aramid, polyvinyl alcohol, glass, carbon, basalt, polypropylene, polyethylene, polyamide, acrylic, ceramic, steel, and combinations thereof. Preferably, the fibers 12 may range in filament size between about 5 μm and about 200 μm.

The fiber bundles 10 may range in size from about 0.2 mm to about 5 mm in diameter, and from about 5 mm to about 60 mm in length. Control of the adhesion properties of the fibers may be achieved by applying a carefully controlled amount of a coating onto the fibers to achieve the spin finish 14 thereof. Preferable spin finish coatings may include oils, silane, polyglycols, silicates, dimethyl urea derivatives, such as, for example, N,N-dimethyl urea, N, N"-1,3 dimethylol-4,5-dihydroxyethylene urea, 1,3-dimethyl-4,5, dihydroxyethylene urea, and dimethyl hydantoin, lithium chloride, butyl stearate and combinations thereof, although other adhesives may be utilized to create the desired frictional adhesion. Preferably, oils utilized to achieve the spin finish 14 of the fibers may include natural oils, such as of animal and/or vegetable origin. Natural oils used herein may be mixed with mineral oils, which may be present in amounts of between about 5% to about 20% by weight or more. Such finishes may be further improved by containing esters of organic polycarboxylic acids or their anhydrides with a monohydric or polyhydric alcohol, or combined esters thereof.

The coating may be a spin finish coating and may be present in an amount of between about 0.5% and about 6.5% by weight of the fiber bundles 10. Optionally, adhesive may be utilized between fibers and on the outer surface of the fiber bundles 10 to control rigidity or flexibility of the fibers bundles 10, based on specific application requirements, which may include various thermoplastic and thermoset polymers and elastomers at a content of between about 0% to about 60% by weight of the fiber bundles 10. Preferable resins may include phenolic, epoxy, polyester, vinyl ester, urethane, or combinations thereof.

The fiber bundles 10 may be mixed with a base material to form a fiber reinforced based material, such as concrete or a composite. The base material may preferably be selected from the group consisting of cement and cementitious binders, such as, for example, high alumina cement, sulfoaluminate cement, alkali-activated cement, magnesium cement, and further may include polymers, ceramics, metals and combinations thereof. The base material may be present in an amount of between about 50% and about 99% by weight of the composite.

Fiber bundles of the present invention may have a fiber count per bundle that may range between about 50 and about 3000 fibers per bundle. Moreover, the fibers may be twisted, which may affect their properties within the fiber bundles. Optionally, the fibers may have filament twist angles of between about 0 and about 100 twists per meter.

In addition, fiber bundles of the present invention may preferably be cut from continuous fiber yarns. Typically, a regular cutting head is used to chop bundles of specific lengths, as desired. In the present invention, the cutting of the fiber into bundles may be accomplished using heat or a combination of heat and a cutting tool to produce fused cut ends. Such fused ends may be beneficial to holding bundles together during base material mixing, and may provide better bonding to the base materials during bundle pull-out when the composite is loaded. Heated cutting may be accomplished using a heated cutting head, a heated knife, plasma, laser, or any other cutting apparatus or mechanism apparent to one of ordinary skill in the art based on the present disclosure.

The fiber bundles 10 may be designed based on the application requirements of the fiber reinforced base material. For example, if high strength of the concrete or composite is required, it may be preferable that all bundles are distributed uniformly in spatial location and orientation, and remain in bundle form during mixing. In certain cases, each bundle should open during mixing to allow more uniform distribution of individual fibers. As discussed above, it is important to control the cohesiveness and flexibility of the fiber bundles 10, to prevent premature fiber bundle rupture. Cohesiveness and flexibility of the fiber bundles 10 may be achieved by adjusting fiber size, fiber count per bundle, fiber bundle size, filament twist angles, types of finish, finish content, resin type and resin content, each of which is discussed above in more detail.

Considerations of Fiber Bundle Size

A fiber bundle can be schematically shown in FIG. 1, wherein the bundle diameter depends on the filament size and fiber count per bundle. The effective bond strength can be defined as:

$$\tau_{eff} = \tau A_{exposed}/A_{total} \quad (5)$$

where $\tau_{eff}$=effective bond strength of each individual fiber
$\tau$=actual bond strength of each individual fiber (such as obtained from pull-out tests)
$A_{exposed}$=exposed surface of a fiber bundle along its circumference
$A_{total}$=total fiber surface per bundle=N ($\pi df$)
N=numbers of filaments per bundle or fiber count per bundle
$d_f$=fiber diameter of single fiber
Since $A_{exposed}$=$\pi^2 R$
R=radius of the fiber bundle, and
R=SQRT (N/$V_{fb}$) $d_f$/2, assuming $V_{fb}$=fiber fraction per bundle (not to be confused with $V_f$), then $$A_{exposed}/A_{total} = \pi^2 R/(\pi d_f N) = \pi/2 \, SQRT(1/(NV_{fb})) \quad (6)$$

$$\text{i.e. } \tau_{eff} = \tau \frac{\pi}{2}\sqrt{\frac{1}{NV_{fb}}} \quad (7)$$

Since $\tau$ of aramid and PVA fibers are too strong (fiber rupture always occurs), it is preferably to utilize a large fiber count per bundle (i.e. N) to bring down $\tau_{eff}$. Also to prevent from fiber rupture, it is preferably to make sure that bundle length ($L_f$) is less than the critical fiber length, $L_f^{crit}$.

$$L_f^{crit} = 2l_c = 2\frac{\sigma_{fu}d_f}{4\tau_{eff}} = \frac{\sigma_{fu}d_f}{2\tau_{eff}} \quad (8)$$

and $$L_f < L_f^{crit} \quad (9)$$

where $\sigma_{fu}$ is fiber rupture strength.

In the following examples, $\tau$=4.5 MPa is used. This value represents a typical high bond strength of hydrophilic fibers with cement.

Example 1

The following is an exemplary fiber bundle in an embodiment of the present invention:

Bundle dimensions: $N$=700, $L_f$=50 mm $V_{fb}$=0.907 (closely packed fiber bundle)

$$A_{exposed}/A_{total}=0.06 \quad (\text{Eqn. (6)})$$

i.e. $\tau_{eff}$=0.06×4.5 MPa=0.27 MPa  (Eqn. (5))

and $\sigma_{fu}$=2250 MPa, $d_f$=12 μm, $$L_f^{crit}=2250 \text{ MPa}\times12 \text{ μm}/(2\times0.27 \text{ MPa})=50.0 \text{ mm} \quad (\text{Eqn. (8)})$$

so $L_f$=50 mm<$L_f^{crit}$->O.K.  (Eqn. (9))

Expected composite properties under direct tension:

assuming $V_f$=2%, g=2

$$\sigma_{cu} = \frac{1}{2}g\tau V_f \frac{L_f}{d_f}, \quad (\text{Eqn. (2)})$$

$$\approx \frac{1}{2}\times2\times0.2\times0.02\times\frac{50 \text{ mm}}{12 \text{ μm}} = 16.7 \text{ MPa}$$

Example 2

It is possible to reduce $L_f$ for better workability, as follows:

Bundle dimension: $N$=200, then $A_{exposed}/A_{total}$=0.1, so $\tau_{\mathit{eff}} = 0.1 \times 4.5 = 0.4$ MPa $L_f^{crit} = 2250 \times 12/(2 \times 0.4) = 33.7$ mm if $L_f = 25$ mm $< L_f^{crit}$ $\sigma_{cu} = 0.4 \times 0.02 \times 25$ mm/12 μm $= 16.7$ MPa Expected tensile strength is the same as that of long fibers with a large bundle in example 1.

Experimental Evidence

Cement composites were made with regular discrete aramid fibers and with engineered aramid fiber bundles separately. Identical fiber type was used in both cases. For the regular Fiber Reinforced Concrete (FRC), two commercially available fiber lengths of 6 mm and 12 mm of the discrete fibers were used. For the High Performance Fiber Reinforced Concrete (HPFRC), engineered fiber bundle as illustrated in example 1 ($L_f=50$ mm, N=700) was used. The matrix compositions are all identical, as well as a fixed fiber content of 2 volume percent in all cases. Direct tensile test and flexural test were performed on these materials to evaluate their corresponding mechanical properties.

Tensile Test

Figure 2:
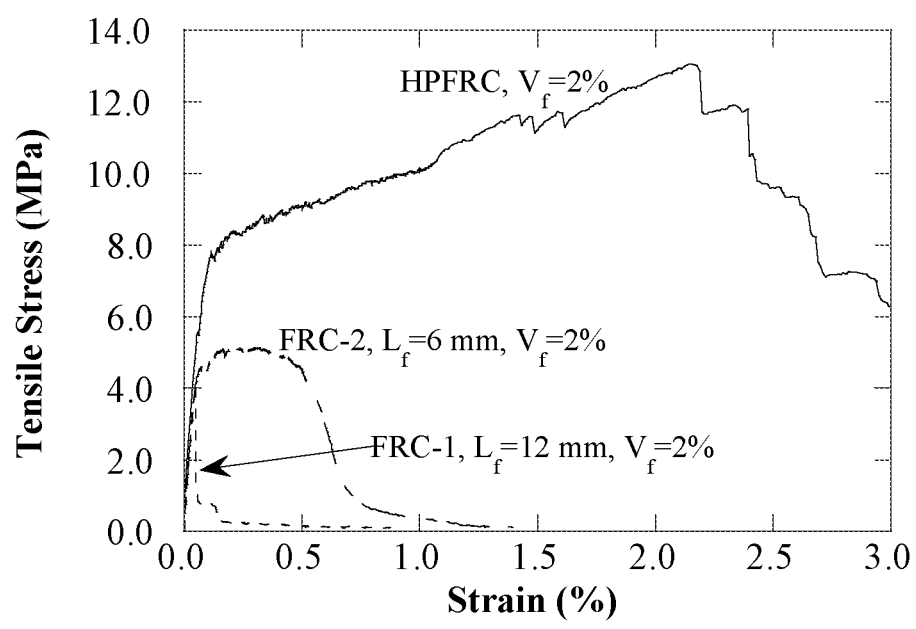
FIG. 2 illustrates a graph showing tensile stress-strain curves of regular FRC and HPFRC.

The test results are summarized in FIG. 2. For the regular FRC reinforced with 12 mm long discrete fibers, a catastrophic failure occurred after reaching the peak load at 4 MPa. This strength level is moderately increased from approximately 2-3 MPa for the plain concrete alone. The ductility of 0.05% (strain at the peak load) remains about the same as the plain concrete. The toughness (0.32 kJ/m$^2$) is the most significant gain due to the long tail of the pullout curve, comparing with 0.01 to 0.1 kJ/m$^2$ in regular concrete. For the 6 mm long FRC, some degree of multiple cracking was observed leading to substantial improvement in ductility (0.4%) and toughness (8.4 kJ/m$^2$); the composite strength is increased to 5 MPa. As expected from our analysis, the HPFRC gives the most impressive results: composite strength up to 13 MPa, ductility up to 2.2%, and toughness up to 28.7 kJ/m$^2$. These values represent 4-6 times, 44 times, and 2-3 order of magnitude increase over plain concrete for strength, ductility, and toughness respectively.

Flexural Test

Figure 3:
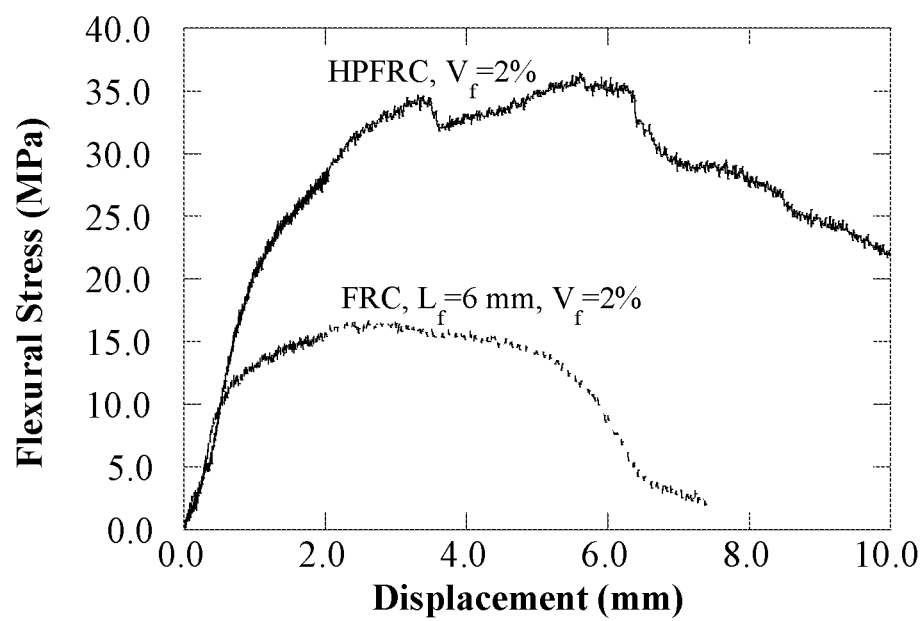
FIG. 3 illustrates a graph showing flexural stress-mid point displacement curves of regular FRC and HPFRC.

Four point flexural tests were also carried out with the above composites. As shown in FIG. 3, the flexural strength (or modulus of rupture, MOR) of the 6 mm FRC is 15 MPa, whereas the MOR of the HPFRC is 37 MPa. These strength improvements are very impressive comparing with a typical value of 2-6 MPa of plain concrete. The flexural toughness (energy absorption, indicated by the area under the complete flexural stress/displacement curves, see FIG. 3) of the HPFRC again vastly outperforms that of the regular FRC, and confirms the results previously obtained from the direct tensile tests.

Compression Test

Compression tests were carried out with high performance concrete mixes reinforced with engineered fiber bundles as illustrated in example 1 ($L_f=50$ mm, N=700). The performance is tabulated in Table 1. In cases of HC-UHPC-1, the very low fiber count was used to maximize cost benefits while achieving a very high compressive strength and high flexural strength. For HC-UHPC-2, moderate fiber count was used to greatly improve the flexural strength (bending resistance). For HC-UHPC, the fiber counts used were significantly lower than typical ultra high performance fiber-reinforced concretes while delivering similar or even superior performance. Such low fiber dosages are possible because of the unique design of the engineered fiber bundle technology, as disclosed herein.

TABLE 1

| Type | Fiber | $V_f$(%) | Compressive Strength ksi (MPa) | Flexural Strength ksi (MPa) |
|---|---|---|---|---|
| HC-UHPC-1 | Aramid | 0.2 | 19 (130) | 4.3 (30) |
| HC-UHPC-2 | Aramid | 1.3 | 16 (110) | 7.3 (50) |

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are non-limiting, and it should be noted that claim limitations presented herein are not meant to describe the invention as a whole. Moreover, the invention illustratively disclosed herein suitably may be practiced in the absence of any element which is not specifically disclosed herein.

I claim:

1. A fiber bundle for use in making a fiber reinforced composite comprising:
   a plurality of fibers grouped together forming the fiber bundle comprising between about 50 and about 3000 fibers, each of the fibers having a finish,
   wherein the fiber bundle comprises a diameter ranging from about 0.2 mm to about 5 mm,
   wherein the fiber bundle comprises a length ranging from about 5 mm to about 60 mm, and
   wherein each of the fibers comprises a filament size ranging from about 5 μm to about 200 μm,
   wherein the finish on each of the fibers holds the fibers together within the fiber bundle via friction and without a cured adhesive.

2. The fiber bundle of claim 1 wherein the plurality of fibers forming the fiber bundle comprises from about 500 fibers to about 2000 fibers,
   wherein the diameter of the fiber bundle ranges from about 0.8 mm to about 3 mm,
   wherein the fiber bundle length ranges from about 10 mm to about 50 mm, and
   wherein the filament sizes of the fibers range from about 10 μm to about 100 μm.

3. The fiber bundle of claim 1 wherein the plurality of fibers forming the fiber bundles comprises from about 700 fibers to about 1400 fibers,
   wherein the diameter of the fiber bundle ranges from about 1 mm to about 2 mm,
   wherein fiber bundle length ranges from about 12 mm to about 40 mm, and
   wherein the filament sizes of the fibers range from about 20 μm to about 50 μm.

4. The fiber bundle of claim 1 further comprising:
   an adhesive disposed on the outside surface of the fiber bundle.

5. The fiber reinforced bundle of claim 4 wherein the adhesive disposed on the outside surface of the fiber bundle is selected from the group consisting of phenolic, epoxy, polyester, vinyl ester, urethane, and combinations thereof.

6. The fiber reinforced bundle of claim 4 wherein the adhesive disposed on the outside surface of the fiber bundle comprises epoxy.

7. The fiber reinforced bundle of claim 1 wherein the fibers are selected from the group consisting of aramid, polyvinyl alcohol, glass, carbon, basalt, polypropylene, polyethylene, polyamide, acrylic, ceramic, steel, and combinations thereof.

8. The fiber reinforced bundle of claim 1 wherein the finish of each of the fibers comprises a coating that promotes hydrogen bonding selected from the group consisting of oils, polyglycols, silicates, dimethyl urea derivatives, lithium chloride, butyl stearate, and combinations thereof.

9. The fiber reinforced bundle of claim 8 wherein the coating on the fibers comprises from about 0.5% to about 6.5% by weight of the fiber bundle.

10. The fiber reinforced bundle of claim 1 wherein the finish of each of the fibers comprises a coating of a natural oil comprising a functional group selected from the group consisting of a carboxyl, an ester, and a hydroxyl.

11. A fiber reinforced cement composite comprising the fiber bundle of claim 1 and a base material.

12. The fiber reinforced composite of claim 11 wherein the base material is selected from the group consisting of portland cement, high alumina cement, sulfoaluminate cement, alkali activated cement, magnesium cement, slag cement, geopolymer cement, plaster cement, and combinations thereof.

13. A method of making a fiber bundle comprising the steps of:
    providing a plurality of fibers;
    coating each of the fibers with a finish; and
    grouping the fibers to form a fiber bundle, wherein the finish on each of the fibers holds the fibers together within the fiber bundle via friction and without a cured adhesive.

14. The method of claim 13 further comprising the step of: applying an adhesive on a surface of the fiber bundle.

15. The method of claim 14 wherein the adhesive disposed on the outside surface of the fiber bundle is selected from the group consisting of phenolic, epoxy, polyester, vinyl ester, urethane, and combinations thereof.

16. The method of claim 14 wherein the adhesive disposed on the outside surface of the fiber bundle comprises epoxy.

17. The method of claim 13 wherein the fibers are selected from the group consisting of aramid, polyvinyl alcohol, glass, carbon, basalt, polypropylene, polyethylene, polyamide, acrylic, cellulose, ceramic, steel, and combinations thereof.

18. The method of claim 13 wherein the fibers range in filament size from about 5 μm to about 200 μm.

19. The method of claim 13 wherein the bundle size ranges in diameter from about 0.2 mm to about 5 mm, and from about 5 mm to about 60 mm in length.

20. The method of claim 13 wherein the finish of each of the fibers comprises a coating selected from the group consisting of oils, polyglycols, silicates, dimethyl urea derivatives, lithium chloride, butyl stearate, and combinations thereof.

21. The method of claim 20 wherein the coating on the fibers comprises from about 0.5% to about 6.5% by weight of the fiber bundle.

22. The method of claim 13 wherein the finish of each of the fibers comprises a coating comprising a natural oil comprising a functional group selected from the group consisting of a carboxyl, an ester, and a hydroxyl.

23. The method of claim 13 wherein the fiber bundle has a fiber content of from about 50 to about 3000 fibers.

24. The method of claim 13 further comprising the step of: cutting the fiber bundle with heat to cause the cut ends of the fiber bundle to fuse together.

\* \* \* \* \*